United States Patent [19]
Law et al.

[11] Patent Number: 6,167,048
[45] Date of Patent: Dec. 26, 2000

[54] CLOCK RECOVERY FOR VIDEO COMMUNICATION OVER ATM NETWORK

[75] Inventors: Randy A. Law, Surrey; Neil B. Cox, Burnaby; Edwin L. Froese, Surrey, all of Canada

[73] Assignee: Alcatel Networks Corporation, Kanata, Canada

[21] Appl. No.: 08/921,553

[22] Filed: Sep. 2, 1997

[30] Foreign Application Priority Data

Aug. 30, 1996 [CA] Canada ..................................... 2184517

[51] Int. Cl.[7] ................................. H04J 3/14; H04L 7/00
[52] U.S. Cl. ........................ 370/395; 375/362; 348/501; 370/508
[58] Field of Search ..................................... 370/395, 503, 370/516, 508, 519; 375/354, 356, 362, 364, 371, 374, 376; 348/500, 501, 536, 537

[56] References Cited

U.S. PATENT DOCUMENTS

| | | | |
|---|---|---|---|
| 5,260,978 | 11/1993 | Fleischer et al. ......................... | 375/364 |
| 5,555,261 | 9/1996 | Nakayama et al. ....................... | 370/356 |
| 5,565,924 | 10/1996 | Haskell ................................... | 370/508 |
| 5,608,731 | 3/1997 | Upp et al. ................................ | 370/516 |
| 5,694,397 | 12/1997 | Burton .................................... | 370/516 |
| 5,721,738 | 2/1998 | Kubota et al. ........................... | 370/519 |
| 5,742,649 | 4/1998 | Muntz ..................................... | 370/356 |
| 5,822,383 | 10/1998 | Muntz et al. ............................ | 375/362 |
| 5,844,891 | 12/1998 | Cox ......................................... | 370/503 |

*Primary Examiner*—Chi H. Pham
*Assistant Examiner*—Steven Nguyen
*Attorney, Agent, or Firm*—Marks & Clerk

[57] ABSTRACT

A method of clock recovery from a fast packet switched asynchronous network wherein a time stamp is transmitted over a network that has variable delay, involves maintaining an input counter at a sending device. The counter has a value dependent on an input clock. The value of the input counter is periodically transmitted over the network to a receiving device. A local counter at a receiving device has a value dependent on a local clock. The received value sample $x_i$ is compared with the local sample $y_i$ to derive the difference $e_i$. The local clock frequency $f_j$ is adjusted such that the average of $Emin_j$, where $Emin_j$ is the minimum of a block of error samples $e_i$, remains close to a predetermined value, preferably zero. The clock recovery method is particularly suitable for MPEG2 video transmitted over ATM.

6 Claims, 1 Drawing Sheet

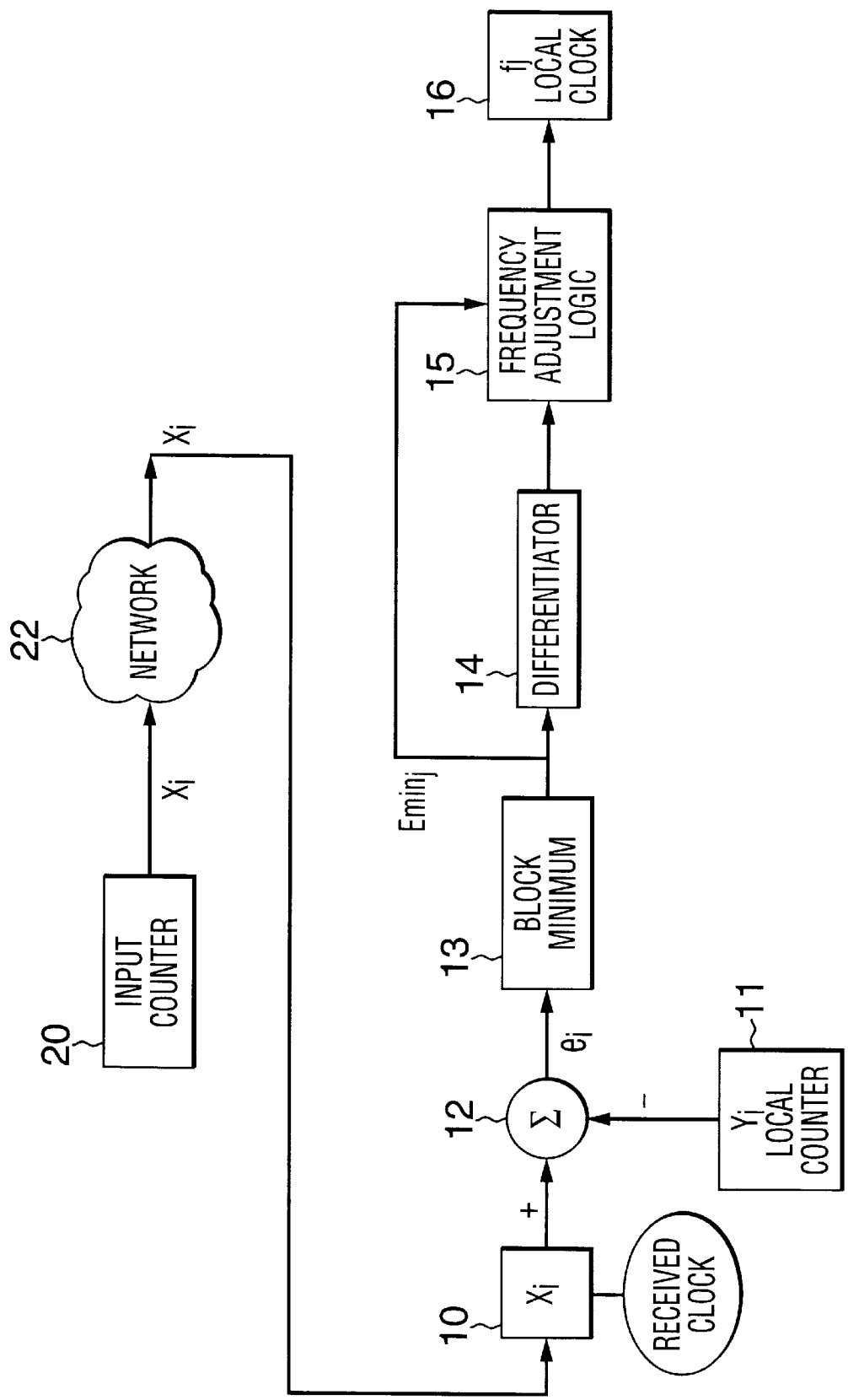

CLOCK RECOVERY FOR VIDEO COMMUNICATION OVER ATM NETWORK

FIELD OF THE INVENTION

This invention relates to fast packet switched asynchronous networks, such as asynchronous transfer mode networks, and more particularly to an improved method of clock recovery for any scenario wherein a time stamp is transmitted over a network that has variable delay video, for example, video communication using the Motion Pictures Experts Group 2 (MPEG2) video encoding standard over such networks.

BACKGROUND OF THE INVENTION

In order to send time sensitive data, such as voice or video, over asynchronous networks, some method has to be found to synchronize the clock on the receiving side of the network with the clock on the sending side so that the time-sensitive data can be properly reconstructed. ATM (Asynchronous Transfer Mode) provides constant bit (CBR) services for AAL-1 cells. ATM standards allow for the transmission through the network of a time-stamp to convey timing information for this purpose.

Our co-pending application no. PCT/CA95/00320, the contents of which are herein incorporated by reference, describes a clock recovery method based on the maximum buffer fill. The essence of the method described in this application, is to adjust fj such that the average of Lmaxj equals the Target buffer fill level, Lmax, where Li is the sample of the buffer fill level, Lmaxj is the maximum of a number of successive samples of Li, and fj is the derived clock frequency.

The rationale for this method is that while the interfering traffic in the network may frequently create points of substantial congestion, it should also be relatively common for cells to pass through the network without substantial delay. Thus, the minimum of the cell delivery delays for a number of ATM cells should be relatively unaffected by the interfering traffic. Even if this is not completely true, it is reasonable to suppose that phenomena which increase the mean cell transmission delay will also increase the variance of the cell transmission delay, so the minimum delay will undergo a smaller change than the mean delay or the maximum delay. Thus, since cell delivery delay is inversely proportional to the buffer fill level when the cell arrives, it follows that the maximum buffer fill-level is intuitively attractive as a driver of CBCR.

When compared with more traditional approach of using mean buffer fill level, the advantage of using the maximum buffer fill level is large when a single bursty source of interfering ATM traffic periodically swamps the capacity of some point of congestion within the network. In that case the mean buffer fill level observed by the receiving entity will be severely affected by the interfering traffic but the maximum buffer fill level will be relatively unaffected.

A stable reference clock is of fundamental importance to the quality of MPEG2 video. When MPEG2 video services are transported over an ATM network, a means must be provided for matching the clock of the MPEG2 source (the input clock) with the clock for the MPEG2 stream generated on exit from the ATM Network (the output clock). One such means is to periodically transmit the value of a counter in the input device, where the counter is directly dependent on the input clock. The receiver can then match its clock to the sender's clock by tracking successive samples of the counter. Note that it is not necessary for both the transmitter and the receiver to have access to a common network clock. The approach can thus be used in virtually all practical scenarios of operation. This means for clock recovery is part of the MPEG2 standard, and the present invention conforms to that part of the standard.

The ATM Network can have a significant effect on the clock recovery process. There can be variability in the time between sampling the input counter and transmitting a cell that carries the sample. This variability is introduced by the sequencing and relative prioritization of tasks performed within the transmitter. Time-varying queuing delays will occur at points of congestion within the ATM network. Finally, sequencing and relative prioritization of tasks performed within the receiver can cause variability in the time between receiving a cell and comparing its counter sample with the local counter.

Of the three sources of interference mentioned above, queuing delays within the network are generally the most problematic, i.e., cell delay variation (CDV). The other sources of interference are under the control of the system designer and can usually be reduced to a manageable level by proper design. Because of the manner of clock recovery, it is inevitable that CDV will introduce unwanted clock variability.

Prior art approaches trade off tolerance of CDV for speed and ability to track clock variation. The standard approach for effecting this trade-off is to employ linear processing techniques, i.e., low-pass filtering or averaging.

An object of the present invention is to reduce the effects of CDV in a system suitable for MPEG2 and like video services.

SUMMARY OF THE INVENTION

According to the present invention there is provided a method of clock recovery from a fast packet switched asynchronous network wherein a time stamp is transmitted over a network that has variable delay, comprising the steps of maintaining an input counter at a sending device, said counter having a value dependent on an input clock;

periodically transmitting the value of said input counter over said network to a receiving device; maintaining a local counter at a receiving device, said local counter having a value dependent on a local clock; comparing the received value sample $x_i$ with the local sample $y_i$ to derive the difference $e_i$; and adjusting the local clock frequency $f_j$ such that the average of $Emin_j$, where $Emin_j$ is the minimum of a block of error samples $e_i$, remains close to a predetermined value.

While the described method sees direct application for MPEG2 communication, it is not limited to that application. The invention is applicable to any scenario where a time stamp is transmitted over a network that has variable delay.

The described method of clock recovery is fully compliant with pertinent MPEG2 standards. All methods operating in accordance with these standards have the undesirable property of translating CDV into clock variation. The principal advantage of the described proposed approach when compared with traditional approaches is a superior tolerance of CDV with no increase in implementation complexity.

The invention uses a nonlinear method of reducing the effects of CDV. Given a fixed ability to track clock variation, the invention provides superior tolerance of CDV under certain realistic assumptions about the properties of the CDV.

BRIEF DESCRIPTION OF THE DRAWINGS

The invention will now be described in more detail, by way of example, only with reference to the accompanying drawings, in which the single FIGURE is a block diagram of a clock recovery system in accordance with the invention for the transmission of MPEG2 format video across an ATM network.

DETAILED DESCRIPTION OF THE PREFERRED EMBODIMENTS

A local clock 10 received samples $x_i$ over network 22 from far end input clock 20 is connected to the plus input of an adder 12. A local counter 11 generating samples $y_i$ is connected to the minus input of the adder 12. The output of adder 12 represents the difference $e_i$, which is fed to a minimum block that extracts the minimum $E_{minj}$ of a block of samples $e_i$. The output of minimum block 13 is passed to a first input of frequency adjustment logic unit 15 through differentiator 14 and directly to a second input. The output of frequency adjustment logic unit produces output signal $f_j$, which represents the local clock 16.

In the clock recovery method for MPEG2 video, the received counter sample $x_i$ is compared to the local counter $y_i$ and the difference $e_i$ is used to drive the adjustment of the local clock. The essence of the method is to adjust the local clock frequency fj such that the average of Eminj stays around zero. Here Eminj is the minimum of a block of clock-error samples ei.

It is not necessary for the MPEG2 application to have the equivalent of "Target Lmax" as described in out co-pending application referred to above. It makes no difference to the quality of the received video if a steady state difference exists between the counter in the transmitter and the corresponding counter in the receiver: All that matters is that the rates at which the counters increment are equal.

The rationale for using $Emin_j$ here is analogous to the rationale for using $Lmax_j$ in CBCR. Specifically, for CBCR Lmaxj because it is associated with the cell that encountered the least amount of delay in passing through the network. For the MPEG2 application, the error signal $e_i$ is a composite of the difference between the transmitter's clock and the receiver's clock plus the time delay di that occurred in transporting the clock sample from the transmitter to the receiver, i.e., ei=$x_i$−$y_i$+$d_i$ where $d_i$ is the delay in transmitting $x_i$. As long as the clocks are reasonably close to being synchronized, it follows that $Emin_j$, like $Lmax_j$, is associated with the cell that encountered the least delay through the network.

The invention thus provides an improved method of minimizing the effects of cell delay variation on MPEG2 video and like services transported over ATM networks.

We claim:

1. A method of clock recovery from a fast packet switched asynchronous network at a near end wherein a time stamp is transmitted at a far end over a network that has variable delay, comprising the steps of:

maintaining an input counter at a sending device at said far end, said input counter having a value dependent on an input clock;

periodically transmitting at said far end a sample value $x_i$ of said input counter over said network to a receiving device at said near end;

receiving at said near end said value $x_i$ of said input counter;

maintaining a local counter at said receiving device, said local counter having a sample value $y_i$ dependent on a local clock;

comparing the received sample value $x_i$ with the sample value $y_i$ of said local counter to derive a difference representing an error sample $e_j$;

deriving the minimum value $Emin_j$ of a block of said error samples $e_j$; and adjusting the local clock frequency $f_j$ such that the average of $Emin_j$ remains close to zero.

2. A method as claimed in claim 1, wherein said local sample is subtracted from said received sample to generate a difference signal and the minimum of said difference signal is determined.

3. A method as claimed in 1, wherein said local clock is used to reproduce a video signal.

4. A method as claimed in 1, wherein said video signal is in MGEP2 format.

5. A method as claimed in 1, wherein said asynchronous network is an ATM network and said time-stamp is an SRTS timestamp.

6. A method as claimed in claim 1, wherein said minimum value $Emin_j$ is passed to local clock frequency both directly and through a differentiator.

\* \* \* \* \*